(12) United States Patent
Chu et al.

(10) Patent No.: US 10,339,045 B2
(45) Date of Patent: Jul. 2, 2019

(54) VALID DATA MANAGEMENT METHOD AND STORAGE CONTROLLER

(71) Applicant: SHENZHEN EPOSTAR ELECTRONICS LIMITED CO., Shenzhen (CN)

(72) Inventors: Hsiu-Hsien Chu, Hsinchu (TW); Hung-Chih Hsieh, Hsinchu County (TW); Yu-Hua Hsiao, Hsinchu County (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 0 days.

(21) Appl. No.: 15/961,906

(22) Filed: Apr. 25, 2018

(65) Prior Publication Data
US 2019/0146909 A1     May 16, 2019

(30) Foreign Application Priority Data
Nov. 16, 2017 (TW) .............................. 106139783 A

(51) Int. Cl.
*G06F 12/00* (2006.01)
*G06F 12/02* (2006.01)
(Continued)

(52) U.S. Cl.
CPC .......... *G06F 12/0246* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS

| 8,966,155 B1* | 2/2015 | Mulligan | G06F 12/0246 711/103 |
| 2012/0110243 A1* | 5/2012 | Yeh | G06F 12/0246 711/103 |

(Continued)

FOREIGN PATENT DOCUMENTS

| TW | I423026 | 1/2014 |
| TW | I592800 | 7/2017 |

*Primary Examiner* — John A Lane
(74) *Attorney, Agent, or Firm* — JCIPRNET

(57) ABSTRACT

A valid data management method and a storage controller are provided. The method includes creating a valid data mark table and a valid logical addresses table corresponding to a target physical unit according to a logical-to-physical table and a target physical-to-logical table corresponding to the target physical unit, wherein the valid data mark table records a plurality of mark values respectively corresponding to a plurality of target logical addresses, the mark values respectively indicate whether the corresponding logical addresses is valid or invalid, and the valid logical addresses table only records one or more valid target logical addresses according to an order of one or more first bit values in the valid data mark table; and identifying one or more valid data of the target physical unit according to the logical-to-physical table, the valid data mark table and the valid logical addresses table corresponding to the target physical unit.

10 Claims, 7 Drawing Sheets

(51) Int. Cl.
*G06F 3/06* (2006.01)
*G06F 11/14* (2006.01)

(52) U.S. Cl.
CPC ........ *G06F 3/0679* (2013.01); *G06F 11/1402* (2013.01); *G06F 12/0292* (2013.01); *G06F 2212/7201* (2013.01)

(56) References Cited

U.S. PATENT DOCUMENTS

2018/0004420 A1* 1/2018 Jung ..................... G06F 3/0604
2018/0095698 A1* 4/2018 Liao ..................... G06F 3/0604
2018/0173420 A1* 6/2018 Li ........................... G06F 3/061
2019/0079830 A1* 3/2019 Kim ................... G06F 11/1441

* cited by examiner

VALID DATA MANAGEMENT METHOD AND STORAGE CONTROLLER

CROSS-REFERENCE TO RELATED APPLICATION

This application claims the priority benefit of Taiwan application serial no. 106139783, filed on Nov. 16, 2017. The entirety of the above-mentioned patent application is hereby incorporated by reference herein and made a part of this specification.

BACKGROUND

Technology Field

The invention relates to a valid data management method, and more particularly, to a valid data management method adapted to a storage device having a rewritable non-volatile memory module and a storage controller.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In general, a storage controller of a storage device having the rewritable non-volatile memory module maintains a logical-to-physical table (L2P table) for monitoring an overall mapping status for logical units and physical units. Also, the storage controller can identify valid data stored in the physical unit through a cross searching between a physical-to-logical table and the logical-to-physical table.

It is assumed that a logical address recorded by the physical-to-logical table of a physical unit corresponds to a physical address. During operations of the storage device, data stored at the logical address may be stored into another physical address. Consequently, the data stored at the physical address becomes invalid data and the logical address becomes an invalid logical address. To identify the valid data in a physical unit, traditionally, whether a mismatching physical address exists is first determined by the cross searching between the physical-to-logical table and the logical-to-physical table. If so, it is then determined that the mismatching physical address of the physical-to-logical table stores the invalid data and a logical address corresponding thereto is invalid. In this way, the valid data stored by the physical unit and its location may also be identified accordingly (an address of the valid data is a matching physical address obtained through the cross searching).

However, in the above process, all entries of the physical-to-logical table will be read. In the case where all entries may contain the invalid data, if the storage controller attempts to identify the valid data stored in the physical unit, the storage controller may consume extra time for reading invalid entries (i.e., reading the corresponding entries stored with invalid data), resulting in waste of resources (e.g., system computing resources).

Therefore, how to use a more advanced way to manage and identify the valid data stored in the physical unit in order to prevent waste of spaces or waste of computing resources is one of the issues to be addressed by persons skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a valid data management method and a storage controller, which are capable of rapidly identifying one or more valid data stored in a target physical unit according to a logical-to-physical table, a valid data mark table and a valid logical addresses table corresponding to the target physical unit. As a result, management efficiency for valid data may be improved to further improve overall working efficiency of the storage device.

An embodiment of the invention provides a valid data management method, which is adapted to a storage device having the rewritable non-volatile memory module. The rewritable non-volatile memory module has a plurality of physical units, and each physical unit among the physical units includes a plurality of physical sub-units. The method includes creating a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit, wherein the target physical-to-logical table records target logical addresses of a plurality of target logical sub-units mapped to a plurality of target physical sub-units according to an arrangement order of the target physical sub-units of the target physical unit, and the target logical addresses respectively correspond to a plurality of target physical addresses of the target physical sub-units, wherein the valid data mark table records a plurality of mark values respectively corresponding to a plurality of target logical addresses, wherein each mark value among the mark values is a first bit value or a second bit value, wherein the first bit value is configured to indicate that the corresponding target logical address is valid, and the second bit value is configured to indicate that the corresponding target logical address is invalid. In addition, the created valid logical addresses table only records one or more valid target logical addresses respectively corresponding to one or more said first bit values according to an order of the one or more said first bit values in the valid data mark table, wherein the one or more valid target logical addresses are the target logical addresses determined as valid among the target logical addresses, wherein the valid data mark table is smaller than the valid logical addresses table, and the valid logical addresses table is smaller than the target physical-to-logical table; and identifying one or more valid data stored in the target physical unit according to the logical-to-physical table, the valid data mark table and the valid logical addresses table corresponding to the target physical unit.

An embodiment of the invention provides a storage controller, which is configured to control a storage device having a rewritable non-volatile memory module. The rewritable non-volatile memory module has a plurality of physical units. The rewritable non-volatile memory module has a plurality of physical units, and each physical unit among the physical units includes a plurality of physical sub-units. The storage controller includes a memory interface control circuit and a processor. The memory interface control circuit is configured to couple to the rewritable non-volatile memory module. The processor is coupled to the memory interface control circuit. The processor is configured to create a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit. The target physical-to-logical table records target logical addresses of a plurality of target logical sub-units mapped to a plurality of target physical sub-units according to an arrangement order of the target physical sub-units of the target physical unit, and the target logical addresses respectively correspond to a plurality of target physical addresses of the target physical sub-units. The valid data mark table records a plurality of mark values respectively corresponding to a plurality of target logical addresses. Each mark value among the mark values is a first bit value or a second bit value. The first bit value is configured to indicate that the corresponding target logical address is valid, and the second bit value is configured to indicate that the corresponding target logical address is invalid. The created valid logical addresses table only records one or more valid target logical addresses respectively corresponding to one or more said first bit values according to an order of the one or more said first bit values in the valid data mark table. The one or more valid target logical addresses are the target logical addresses determined as valid among the target logical addresses. The valid data mark table is smaller than the valid logical addresses table, and the valid logical addresses table is smaller than the target physical-to-logical table. The processor is further configured to identify one or more valid data stored in the target physical unit according to the logical-to-physical table, the valid data mark table and the valid logical addresses table corresponding to the target physical unit.

Based on the above, the valid data management method and the storage controller provided by the invention are capable of creating the valid data mark table and the valid logical addresses table smaller than the physical-to-logical table according to the logical-to-physical table and the physical-to-logical table corresponding to the target physical unit, and maintaining the valid data mark table and the valid logical addresses table in the static random access memory with higher speed and smaller capacity and the dynamic random access memory with lower speed and larger capacity, respectively. In this way, the valid data mark table corresponding to the target physical unit may be quickly found, and the one or more valid data stored in the target physical unit may be identified according to the valid logical addresses table and the logical-to-physical table. As a result, identification efficiency for valid data may be improved to further improve overall working efficiency of the storage device.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
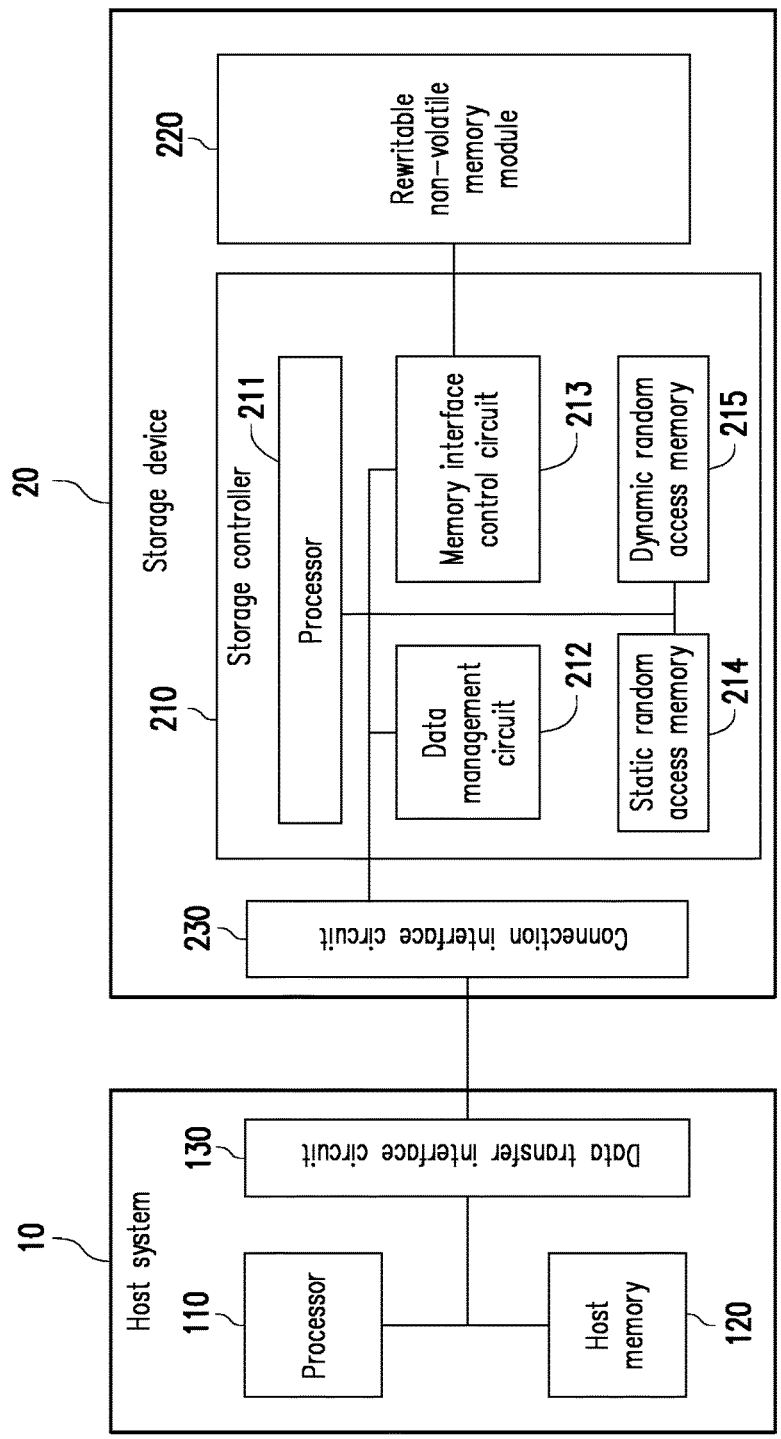
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In the present embodiment, a storage device includes a rewritable non-volatile memory module and a storage device controller (also referred to as a storage controller or a storage control circuit). Also, the storage device is usually used together with a host system so the host system can write data into or read data from the storage device.

FIG. 1 is a block diagram illustrating a host system and a storage device according to an embodiment of the invention.

Referring to FIG. 1, a host system 10 includes a processor 110, a host memory 120 and a data transfer interface circuit 130. In the present embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212, a memory interface control circuit 213, a static random access memory (SRAM) 214, and a dynamic random access memory (DRAM) 215.

In the present embodiment, the host system 10 is coupled to the storage device 20 through the data transfer interface circuit 130 and the connection interface circuit 230 of the storage device 20 to perform a data access operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In the present embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In the present embodiment, the host memory 120 is configured to temporarily store commands executed by the processor 110 or data.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated). More particularly, the ROM has a boot code, which is executed by the processor 211 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In the present embodiment, operations performed by each part of the storage controller 220 may also be considered as operations performed by the storage controller 220.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., write operations performed according to write commands from the host system 10). As another example, the data may be read from one or more physical units of the rewritable non-volatile memory module 220 by the memory interface control circuit 213 (the data maybe read from one or more memory cells/physical sub-units in the one or more physical units), and the read data may be written into the host system 10 (e.g., the host memory 120) through the connection interface circuit 230 (e.g., read operations performed according to read commands from the host system 10). In another embodiment, the data management circuit 212 may also be integrated into the processor 211.

The memory interface control circuit 213 is configured to perform write (or, programming) operation, read operation and erase operation for the rewritable non-volatile memory module 220 together with the data management circuit 212 under instruction of the processor 211.

For instance, the processor 211 can execute a write command sequence (or the processor 211 instructs the data management circuit 212 to send the write command sequence to the memory interface control circuit 213), so as to instruct the memory interface control circuit 213 to write data into one or more physical addresses (also referred to as target physical addresses) in the rewritable non-volatile memory module 220; For instance, the processor 211 can execute a read command sequence (or the processor 211 instructs the data management circuit 212 to send the read command sequence to the memory interface control circuit 213), so as to instruct the memory interface control circuit 213 to read data from one or more physical addresses (also referred to as the target physical addresses) corresponding to the read command in the rewritable non-volatile memory module 220; For instance, the processor 211 can execute an erase command sequence (or the processor 211 instructs the data management circuit 212 to send the erase command sequence to the memory interface control circuit 213), so as to instruct the memory interface control circuit 213 to perform an erase operation on the rewritable non-volatile memory module 220. Each of the write command sequence, the read command sequence and the erase command sequence may include one or more program codes or command codes, which are configured to perform the corresponding operations of writing, reading and erasing for the rewritable non-volatile memory module 220. In an embodiment, the processor 211 can further give other command sequences to the memory interface control circuit 213 so as to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 attempts to access the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence as an instruction for writing data, the read command sequence as an instruction for reading data, the erase command sequence as an instruction for erasing data, and other corresponding command sequences as instructions for performing various memory operations (e.g., a garbage collection operation, a wear leveling operation, etc.). The command sequences may include one or more signals, or data transmitted in the bus. The signals or the data may include command codes and program codes. For example, information such as identification codes and memory addresses are included in the read command sequence.

In the present embodiment, the static random access memory 214 (also referred to as a first memory) and the dynamic random access memory 215 (also referred to as a second memory) are coupled to the processor 211 and configured to temporarily store data and commands from the host system 10, data from the rewritable non-volatile memory module 220 or other system data for managing the storage device 20 so the processor 211 can quickly access the data, the commands or the system data from the static random access memory 214 or the dynamic random access memory 215. Among them, the static random-access memory 214 has a faster speed than the dynamic random access memory 215, the static random access memory 214 has a higher hardware cost than the dynamic random access memory 215, and the static random-access memory 214 has a smaller capacity than the dynamic random access memory 215. In other words, although the first memory 214 can store less data, a speed of the processor 211 for accessing the data stored in the first memory 214 (an accessing speed) is higher than a speed for accessing the data stored in the second memory 215. The processor 211 can maintained certain small system data in the first memory 214, so as to accelerate overall management efficiency for the storage controller. In the invention, types of the first memory 214 and the second memory 215 are not limited, and yet, at least one feature of the first memory 214 and the second memory 215 disclosed by the invention—a relation regarding the accessing speed—is limited. For example, in another embodiment, the first memory 214 may be other kinds of memory with the accessing speed higher than that of the second memory 215.

The rewritable non-volatile memory module 220 is coupled to the storage controller 210 (the memory interface control circuit 213) and configured to store data written from the host system 10. The rewritable non-volatile memory module 220 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a 3D NAND flash memory module or a vertical NAND flash memory module, other flash memory modules or any memory module having the same features. The memory cells in the rewritable non-volatile memory module 220 are disposed in an array.

In the present embodiment, the memory cells of the rewritable non-volatile memory module 220 can constitute a plurality of physical programming units (also referred to as physical sub-units), and the physical programming units can constitute a plurality of physical blocks (also referred to as physical erasing units or physical units). Specifically, the memory cells on the same word line (or the same word line layer) can constitute one or more of the physical programming units. The processor 211 assigns a plurality of physical addresses for the physical sub-units, respectively.

In the following embodiments, the memory cell is used as a minimum unit for writing (programming) data. The physical unit is a minimum unit for erasing (i.e., each physical unit includes a minimum number of memory cells to be erased together). Also, the physical unit is a physical block, the physical sub-unit is a physical page, and each physical address is used to represent an address of the corresponding physical page.

It should be noted that, in the present embodiment, the system data for recording information of a physical unit may be referred to as physical unit information, which can be recorded by using one or more physical sub-units in the physical unit or recorded by one or more physical sub-units of a specific physical unit for recording all the system data in one system area. In the present embodiment, the physical unit information includes information such as an erase count value (program erase cycle; PEC), a timestamp, a read counter value, and a physical unit index of the physical unit. More specifically, when the processor 211 performs the erase operation on a physical unit, after completing the erase operation, the processor 211 adds 1 to the current erase count value corresponding to the physical unit (for example, starting from 0, the erase count value accumulates each time the erase operation is performed). In other words, the erase count value can reflect a total number of times that the corresponding physical unit is erased. The timestamp is configured to indicate the time when a first data is stored in the corresponding physical unit. The size of the timestamp (i.e., a difference in numerical value) may be used to indicate a temporal sequence. A detailed format of the timestamp is not particularly limited in the invention. The read counter value is configured to calculate a total number of times that the corresponding physical unit is read. The physical unit index is configured to represent a unique identification code of the corresponding physical unit so the processor 211 can identify the corresponding physical unit and relevant data according to the physical unit index. In the present embodiment, the system data corresponding to a physical unit further includes a physical-to-logical table corresponding to the physical unit. The physical-to-logical table corresponding to the physical unit will be described below with reference to FIG. 6.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. Each logical unit may be mapped to one or more physical units, wherein the physical unit may be one or more physical addresses, one or more physical sectors, one or more physical programming units, or one or more physical erasing units. In the present embodiment, the logical unit is a logical block, and the logical sub-unit is a logical page. Each logical unit includes a plurality of logical sub-units.

Moreover, the storage controller 210 creates a logical-to-physical address mapping table (also referred to as a logical-to-physical table; L2P table) and a physical-to-logical address mapping table (also referred to as physical-to-logical table; P2L table) respectively corresponding to a plurality of physical units, so as to record mapping relations among the logical units (e.g., logical blocks, logical pages, or logical sectors) assigned for the rewritable non-volatile memory module 220 and the physical units (e.g., physical erasing units, physical programming units, or physical sectors). In other words, the storage controller 210 can find the physical address mapped to the logical address from the logical-to-physical table, and the storage controller 210 can find the logical address mapped to the physical address from the physical-to-logical table. Nonetheless, the technical concept for mapping relations among the logical addresses and the physical addresses is a well-known technical means in the field, which is not repeated hereinafter.

In an embodiment, the storage controller 210 further includes a power management circuit. The power management circuit is coupled to the processor 211 and configured to control power of the storage device 20.

Figure 2:
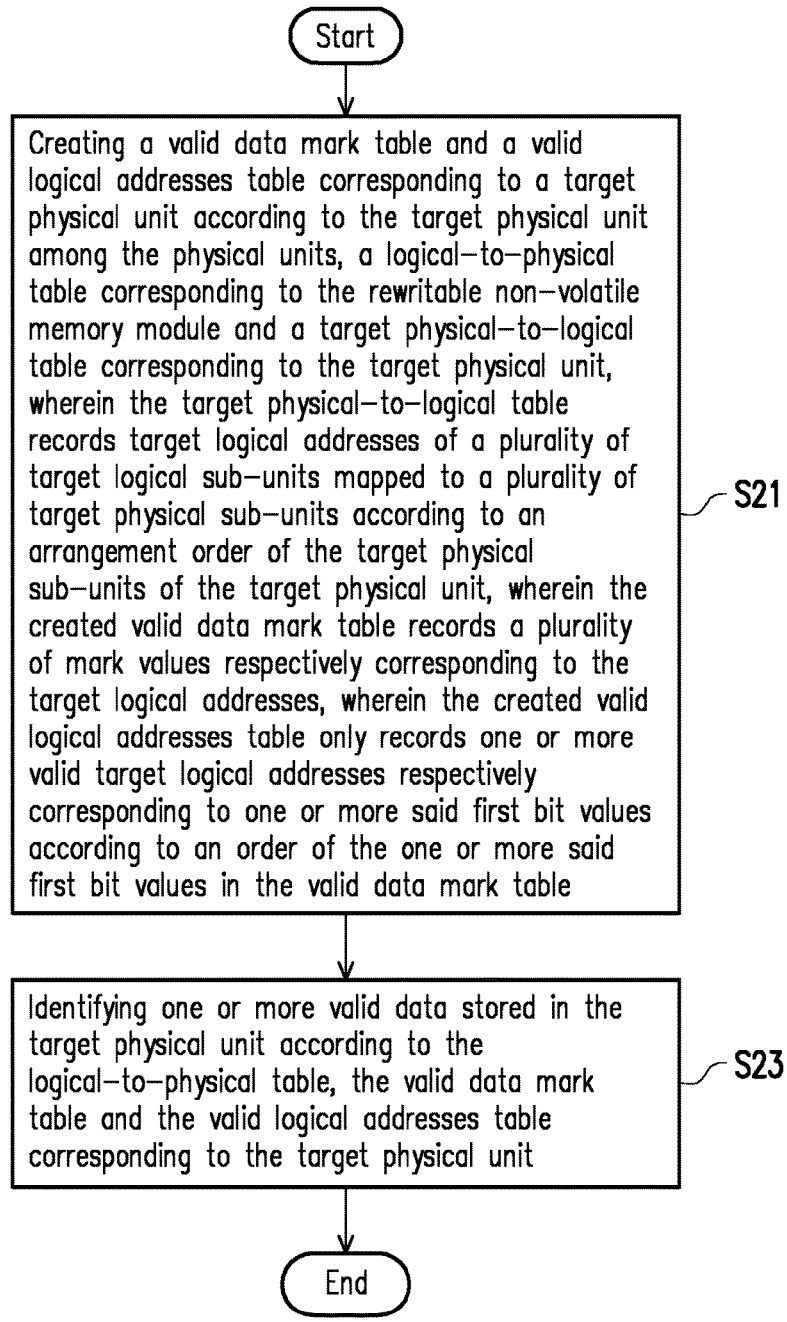
FIG. 2 is a flowchart illustrating a valid data management method according to an embodiment of the invention.

FIG. 2 is a flowchart illustrating a valid data management method according to an embodiment of the invention. With reference to FIG. 2, in step S21, the processor 211 creates a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit, wherein the target physical-to-logical table records target logical addresses of a plurality of target logical sub-units mapped to a plurality of target physical sub-units according to an arrangement order of the target physical sub-units of the target physical unit, wherein the created valid data mark table records a plurality of mark values respectively corresponding to the target logical addresses, wherein the created valid logical addresses table only records one or more valid target logical addresses respectively corresponding to one or more said first bit values according to an order of the one or more said first bit values in the valid data mark table.

More specifically, the target physical-to-logical table records target logical addresses of a plurality of target logical sub-units mapped to a plurality of target physical sub-units according to an arrangement order of the target physical sub-units of the target physical unit, and the target logical addresses respectively correspond to a plurality of target physical addresses of the target physical sub-units. Each mark value among the mark values is a first bit value (e.g., "1") or a second bit value (e.g., "0"), wherein the first bit value is configured to indicate that the corresponding target logical address is valid, and the second bit value is configured to indicate that the corresponding target logical address is invalid. The one or more valid target logical addresses are the target logical addresses determined as valid among the target logical addresses, wherein the valid data mark table is smaller than the valid logical addresses table (in size), and the valid logical addresses table is smaller than the target physical-to-logical table (in size).

In the present embodiment, the processor 211 can select one physical unit from all of the physical units of the rewritable non-volatile memory module 220 as the target physical unit according to a preset rule, so as to perform the operation of creating the valid data mark table and the valid logical addresses table corresponding to the target physical unit. For example, the preset rule may be: (1) when the storage device is idle, selecting the physical unit with a fewer number of the valid data as the target physical unit; (2) when the storage device is turned on, sequentially selecting the physical unit from all of the physical units of the rewritable non-volatile memory module 220. Settings for the preset rule are not particularly limited in the invention.

It is noted that, in the present embodiment, the processor 211 records a number of one or more valid physical sub-units configured to store the valid data in each physical unit among the physical units as a valid data count corresponding to said each physical unit in the static random access memory 214 or the dynamic random access memory 215 in real time. In other words, the processor 211 monitors a size of the valid data stored by each physical unit in real time, and use the size as the valid data count of the corresponding physical unit (which is also a system data corresponding to the physical unit).

In the present embodiment, for the selected target physical unit, the processor 211 first determines whether the valid data mark table corresponding to the target physical unit exists, and then determines whether to create (or recreate/rebuild) the valid data mark table and the valid logical addresses table corresponding to the target physical unit according to the valid data count.

Figure 3:
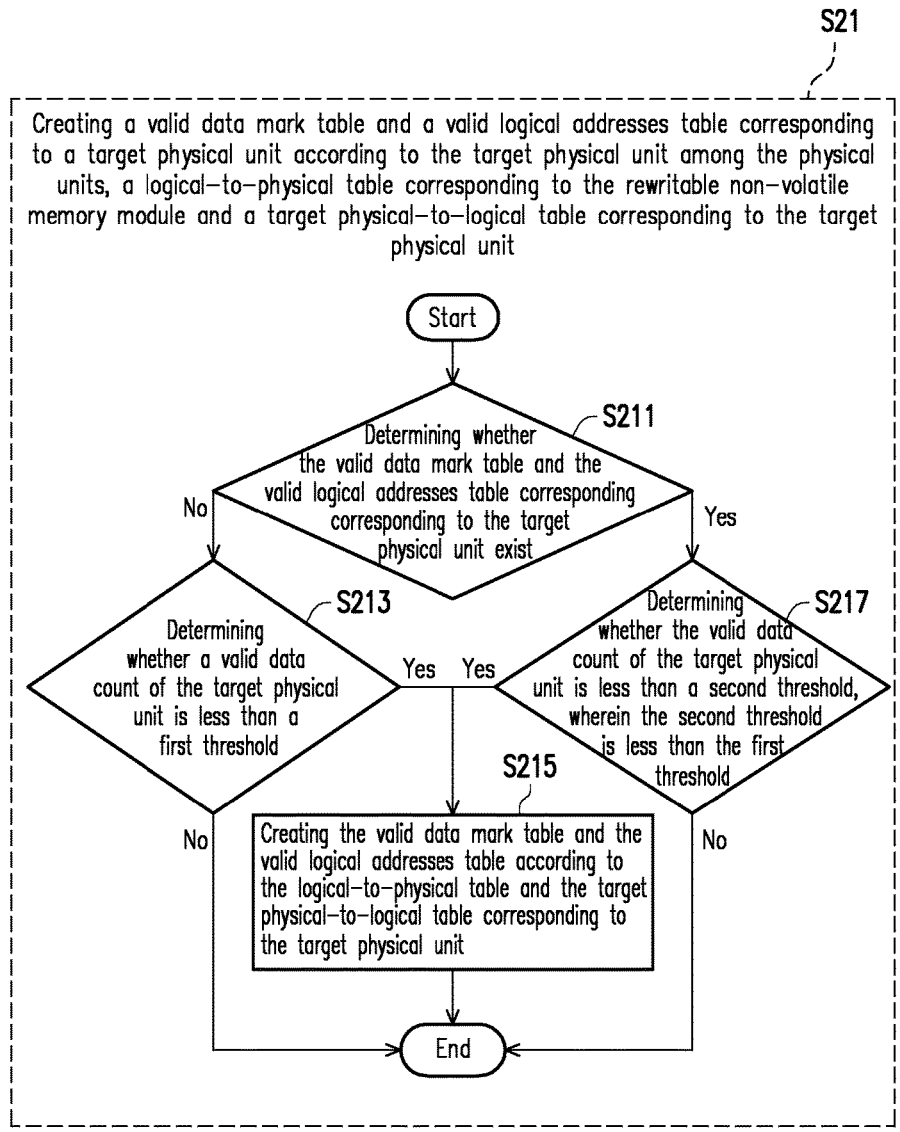
FIG. 3 is a flowchart illustrating step S21 (creating a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit) in FIG. 2 according to an embodiment of the invention.

FIG. 3 is a flowchart illustrating step S21 in FIG. 2 according to an embodiment of the invention. With reference to FIG. 3, in step S211, the processor 211 determines whether the valid data mark table and the valid logical addresses table corresponding to the target physical unit exist. Specifically, the processor 211 first finds out whether the rewritable non-volatile memory module 220 or the static random-access memory 214 is already stored with the valid data mark table corresponding to the target physical unit.

If none of the rewritable non-volatile memory module 220 and the static random access memory 214 is stored with the valid data mark table corresponding to the target physical unit, in step S213, the processor 211 determines whether the valid data count is less than a first threshold. If the valid data count of the target physical unit is not less than the first threshold, the processor 211 does not create the valid data mark table and valid logical addresses table corresponding to the target physical unit, and ends step S21 for the target physical unit. Then, the processor 211 may select another physical unit as the target physical unit and re-execute step S21.

In step S211, if it is determined that the rewritable non-volatile memory module 220 or the static random access memory 214 is stored with the valid data mark table corresponding to the target physical unit, step S217 is executed, in which the processor 211 determines whether the valid data count is less than a second threshold, wherein the second threshold is less than the first threshold. It is noted that, in the using process, the physical unit stored with a plurality of valid data may have part of the valid data becoming the invalid data after the host system accesses the storage device, and yet the invalid value will not become the valid data. In other words, in each physical unit stored with multiple valid data, the corresponding valid data count is gradually reduced with use of the storage device. Accordingly, in the present embodiment, it is given that the valid data mark table exists and, as described in step S213, the valid data mark table is created because of the valid data count being less than the first threshold. Therefore, given that the valid data count is gradually reduced, the second threshold is set to be smaller than the first threshold, so as to further update (recreate) the valid data mark table and the valid logical addresses table corresponding to the physical unit when the valid data count of that physical unit becomes even smaller. If the processor 211 determines that the valid data count of the target physical unit is not less than the second threshold in step S217, the processor 211 does not create the valid data mark table and valid logical addresses table corresponding to the target physical unit, and ends step S21 for the target physical unit. Then, the processor 211 may select another physical unit as the target physical unit and re-execute step S21. It is noted that, the created valid data mark table and the created valid logical addresses table are written into a system physical unit in the rewritable non-volatile memory module 220, and then the valid data mark table and the valid logical addresses table stored in the static random-access memory 214 and the dynamic random access memory 215 are deleted. The system physical unit is one or more specific physical units of the rewritable non-volatile memory module 220 configured to store the valid data mark table and the valid logical addresses table for each physical unit or store the physical-to-logical table for each physical unit. In the present embodiment, the target physical-to-logical table of the target physical unit is maintained in the dynamic random access memory 215 only when the valid data mark table and the valid logical addresses table are to be created for the target physical or when the target physical unit is an open physical unit. When the valid data mark table and the valid logical addresses table of the target physical unit are completely created or when the target physical unit becomes a close physical unit, the target physical-to-logical table of the target physical unit is written into the rewritable non-volatile memory module 220 and then deleted from the dynamic random access memory 215.

It should be noted that, the processor 211 can dynamically set the first threshold and the second threshold according to a system loading. The system loading includes a physical unit usage status and a host accessing status. For instance, the physical unit usage status is used to, for example, indicate a number of times (or frequency) of the physical unit being accessed. As the physical unit usage status corresponding to a physical unit is higher, the first threshold and the second threshold corresponding to the physical unit may be set to values lower than preset values. As another example, the host access status is used to, for example, indicate a number of times (frequency) of the storage device 20 being accessed by the host system 10. As the host accessing status corresponding to a physical unit is higher, the first threshold and the second threshold may be set to values lower than preset values. It should be noted that, in an embodiment, if the valid data count of one physical unit is less than a third threshold, the processor 211 can perform the garbage collection operation or a data merging operation on the physical unit. Here, the third threshold value is less than the second threshold value.

If the processor 211 determines that the valid data count of the target physical unit is less than the first threshold in step S213 or the processor 211 determines that the valid data count of the target physical unit is less than the second threshold in step S217, the processor 211 proceeds to execute step S215. In step S215, the processor 211 creates the valid data mark table and the valid logical addresses table according to the logical-to-physical table and the target physical-to-logical table corresponding to the target physical unit. A method for creating the valid data mark table and the valid logical addresses table is described in detail below with reference to FIG. 4, FIG. 6, FIG. 7A and FIG. 7B.

Figure 4:
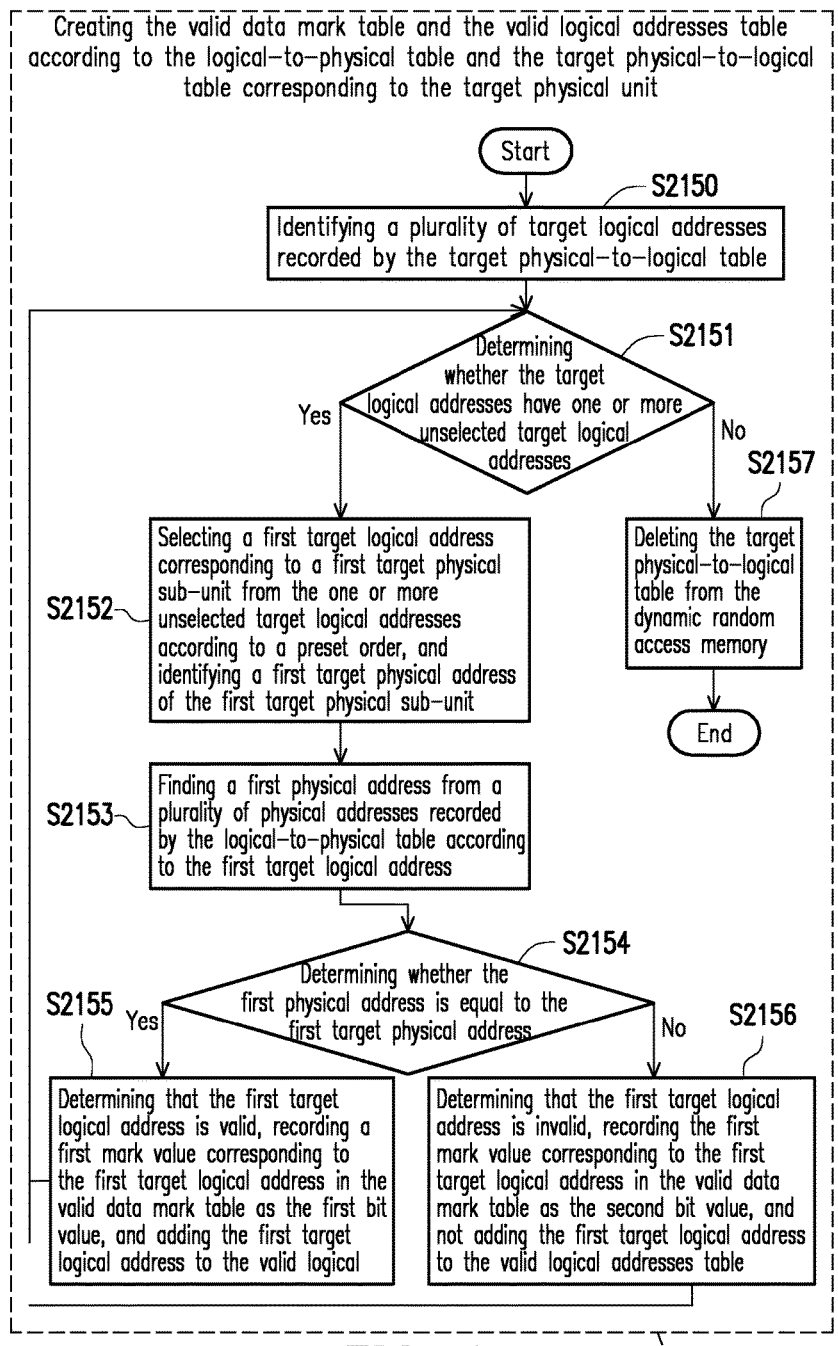
FIG. 4 is a flowchart illustrating step S215 (creating the valid data mark table and the valid logical addresses table according to the logical-to-physical table and the target physical-to-logical table corresponding to the target physical unit) of FIG. 3 according to an embodiment of the invention.
Figure 6:
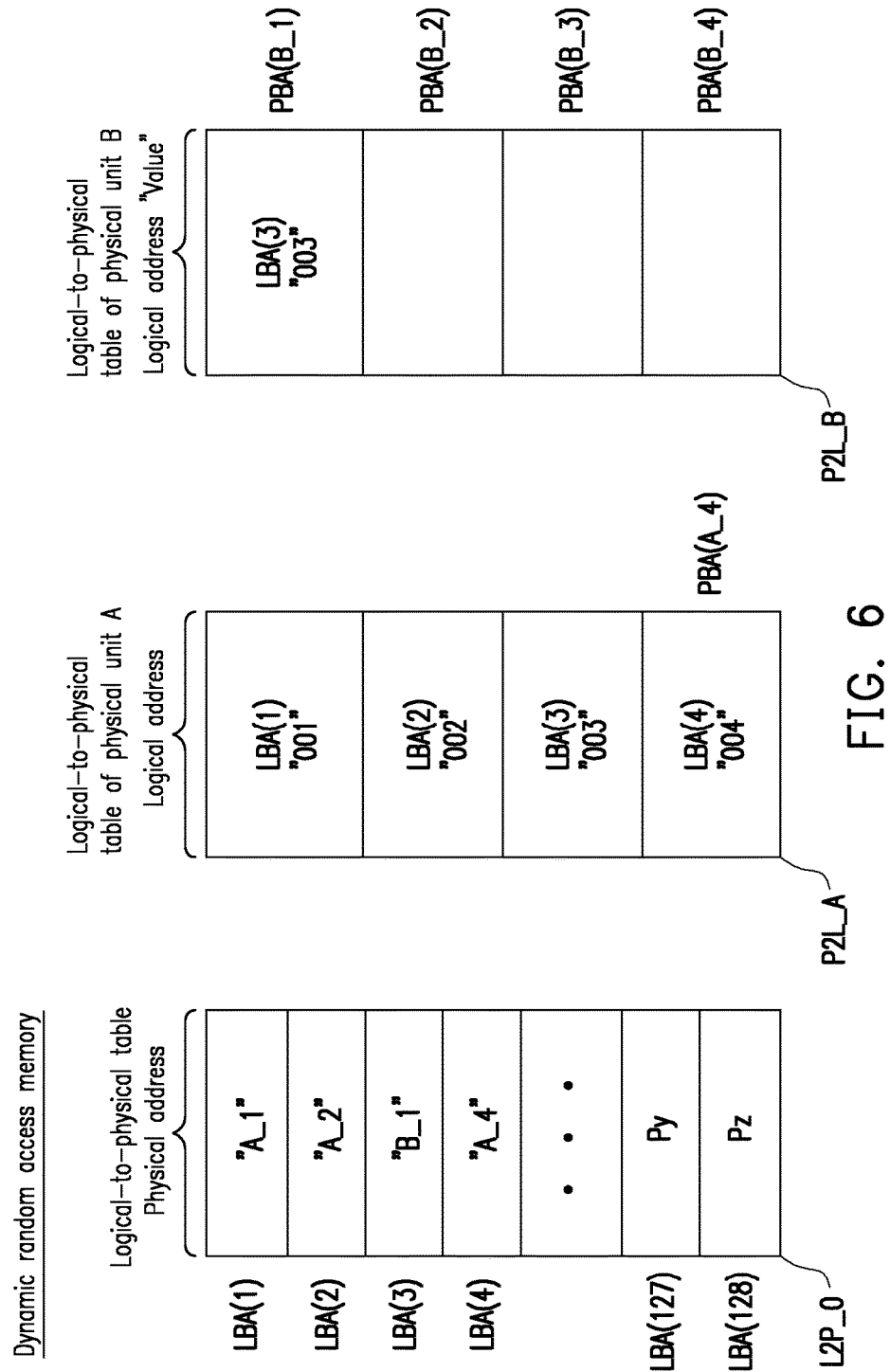
FIG. 6 is a schematic diagram illustrating a logical-to-physical table and a physical-to-logical table according to an embodiment of the invention.

FIG. 4 is a flowchart illustrating step S215 in FIG. 3 according to an embodiment of the invention. FIG. 6 is a schematic diagram illustrating a logical-to-physical table and a physical-to-logical table according to an embodiment of the invention.

With reference to FIG. 6, an example is provided in which it is assumed that the rewritable non-volatile memory module 220 has 32 physical units, and each of the physical units includes 4 physical sub-units. In other words, the rewritable non-volatile memory module 220 includes 128 physical sub-units to be mapped to all of the logical sub-units. According to an arrangement order of a plurality of logical addresses LBA(1) to LBA(128) of the logical sub-units, a logical-to-physical table L2P_0 corresponding to the rewritable non-volatile memory module 220 sequentially records information (values) of a plurality of physical addresses of a plurality physical sub-units mapped to the logical sub-units (e.g., "A_1", "A_2", "B_1", "A_4", Py and Pz). Further, it is assumed that, a physical-to-logical table P2L_A corresponding to a physical unit A (also referred to as a target physical unit A) records information (values) of a plurality of logical addresses (also referred to as target logical address) LBA(1) to LBA(4) of a plurality of logical sub-units (also referred to as target logical sub-units) mapped to a plurality of physical sub-units (i.e., "001", "002", "003" and"004") according to an arrangement order of the physical sub-units of the physical unit A-namely, an order of the physical addresses (also referred to as target physical addresses) PBA(A_1), PBA(A_2), PBA(A_3) and PBA(A_4). In other words, through the physical-to-logical table P2L_A, the processor 211 can learn that the target physical addresses PBA(A_1), PBA(A_2), PBA(A_3) and PBA(A_4) correspond to the target logical addresses LBA(1), LBA(2), LBA(3) and LBA(4) respectively. In other words, the information recorded by the physical-to-logical table P2L_A is configured to indicate that data currently stored at the target physical addresses PBA(A_1), PBA(A_2), PBA(A_3) and PBA(A_4) should be stored in the target logical addresses LBA(1), LBA(2), LBA(3) and LBA(4) visible by the host system 10.

Referring to FIG. 4 and FIG. 6 together, in step S2150, the processor 211 identifies a plurality of target logical addresses recorded by the target physical-to-logical table. For instance, according to the example above, the processor 211 can identify the target logical addresses LBA(1), LBA(2), LBA(3) and LBA(4) recorded by the target physical-to-logical table P2L_A and read the information (e.g., "001", "002", "003" and "004") therein. Next, in step S2151, the processor 211 determines whether the target logical addresses LBA(1), LBA(2), LBA(3) and LBA(4) have one or more unselected target logical addresses. Specifically, in the present embodiment, the processor 211 selects one target logical address from the unselected target logical addresses for creating the valid data mark table and valid logical addresses table. It is assumed that, at the beginning, all of the target logical addresses LBA(1), LBA(2), LBA(3) and LBA(4) are unselected so the processor 211 can determine that there are the one or more unselected target logical addresses in step S2151, and proceed to execute step S2152.

In step S2152, the processor 211 selects a first target logical address corresponding to a first target physical sub-unit from the one or more unselected target logical addresses according to a preset order, and identifies a first target physical address of the first target physical sub-unit. Specifically, in the present embodiment, the preset order means that the processor 211 starts selecting from the first one of the unselected target logical address (i.e., the target logical address LBA(1)) according to the arrangement order of the target logical addresses LBA(1), LBA(2), LBA(3) and LBA(4). The first target logical address LBA(1) corresponds to the first target physical sub-unit of the target physical unit A, and the processor can identify the physical address corresponding to the first target physical sub-unit as the target physical address (also referred to as the first target physical address) PBA(A_1), which has the value "A_1". That is to say, the processor 211 can identify the first target physical address PBA(A_1) corresponding to the first target logical address LBA(1) according to the physical-to-logical table P2L_A.

Next, in step S2153, the processor 211 finds a first physical address from a plurality of physical addresses recorded by the logical-to-physical table according to the first target logical address. Specifically, the processor 211 can find out from the logical-to-physical table L2P_0 that the value of the physical address (also referred to as the first physical address) corresponding to the first target logical address LBA(1) is "A_1".

After the first physical address corresponding to the first target logical address LBA(1) is found from the logical-to-physical table L2_P0, step S2154 is then executed. In step S2154, the processor 211 determines whether the first physical address is equal to the first target physical address. In this example, the processor 211 determines that the first physical address is equal to the first target physical address (i.e., "A_1"="A_1").

If it is determined that the first physical address is equal to the first target physical address, step S2155 is then executed. In step S2155, the processor 211 determines that the first target logical address is valid, records a first mark value corresponding to the first target logical address in the valid data mark table as the first bit value, and adds the first target logical address to the valid logical addresses table.

Figures 7A, 7B:
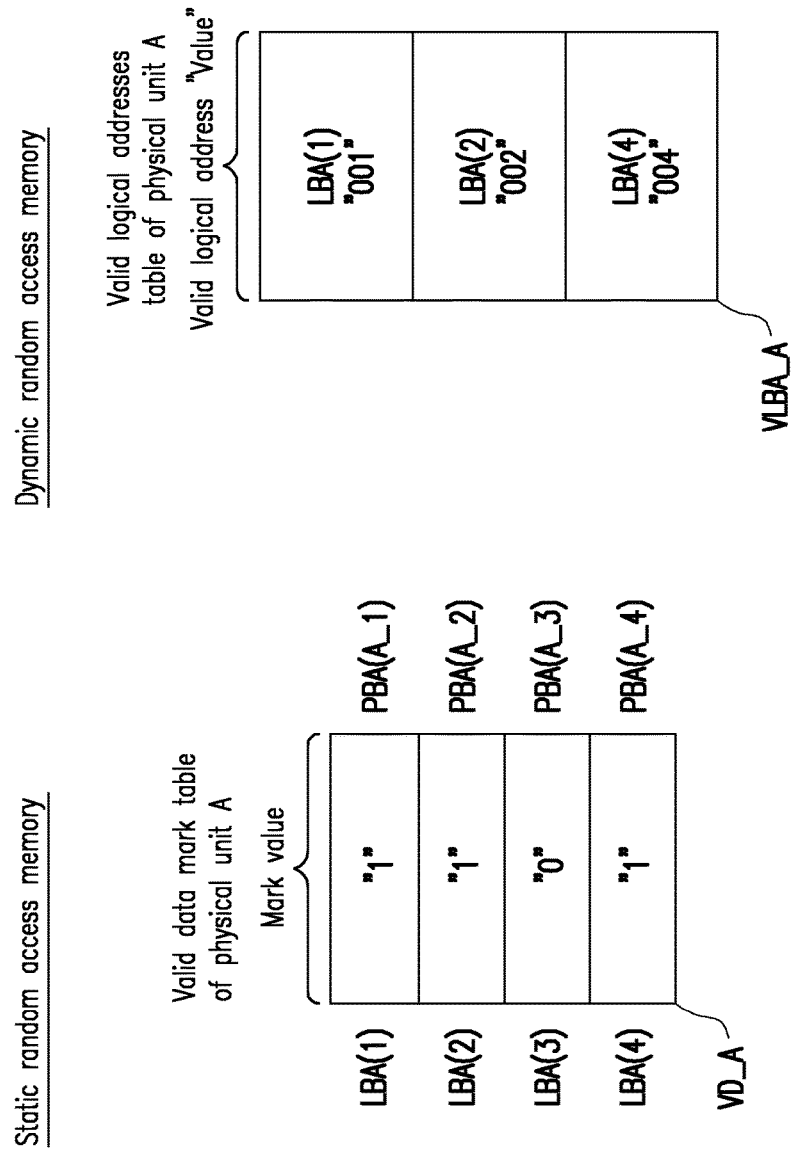
FIG. 7A is a schematic diagram illustrating the valid data mark table according to an embodiment of the invention.
FIG. 7B is a schematic diagram illustrating the valid logical addresses table according to an embodiment of the invention.

FIG. 7A is a schematic diagram illustrating the valid data mark table according to an embodiment of the invention. FIG. 7B is a schematic diagram illustrating the valid logical addresses table according to an embodiment of the invention. With reference to FIGS. 7A and 7B, as described in the example above, the processor 211 determines that the data stored at the first target logical address LBA(1) is the valid data, and determines that the first target logical address LBA(1) recorded by the physical-to-logical table P2L_A is valid. Next, the processor 211 records the mark value corresponding to the first target logical address LBA(1) (which is also mapped to the first physical address PBA(A_1)) in a valid data mark table VD_A corresponding to the target physical unit A maintained in the static random-access memory 214 as "1". Then, the processor 211 adds the first target logical address LBA(1) to a valid logical addresses table VLBA_A corresponding to the target physical unit A maintained in the dynamic random access memory 215 (i.e., "001" recorded by the valid logical addresses table VLBA_A).

Afterwards, the overall process returns to step S2151. By analogy, the processor 211 selects the logical address LBA(2) as the new first target logical address LBA(2). Next, the processor 211 determines that the target logical address LBA(2) recorded by the physical-to-logical table P2L_A is valid, records the mark value corresponding to the target logical address LBA(2) (or corresponding to the target physical address PBA(A_2)) as "1", and adds the target logical address LBA(2) to the valid logical addresses table VLBA_A. It should be noted that, the value "002" of the target logical address LBA(2) is arranged subsequent to the value "001" of the target logical address LBA(1).

Afterwards, the overall process returns to step S2151. By analogy, the processor 211 selects the logical address LBA(3) as the new first target logical address LBA(3). However, according to the logical-to-physical table L2P_0, the physical address corresponding to the logical address LBA(3) recorded by the logical-to-physical table L2P_0 is "B_1", which is a physical address PBA(B_1) of the first one of physical sub-units of a physical unit B (thus, it can be known that, the logical address LBA(3) recorded by a physical-to-logical table P2L_B of the physical unit B is valid). Therefore, in step S2154, the processor 211 determines that the first physical address corresponding to the first target logical address LBA(3) recorded in the logical-to-physical table L2P_0 is different from the first target physical address PBA(A_3) corresponding to the first target logical address LBA(3) recorded in the physical-to-logical table P2L_A (i.e., "B_1"≠"A_3"). As such, in step S2156, the processor 211 determines that the first target logical address is invalid, records the first mark value corresponding to the first target logical address in the valid data mark table as the second bit value, and does not add the first target logical address to the valid logical addresses table. Specifically, the processor 211 determines that the data stored at the first target logical address LBA(3) is the invalid data, and determines that the first target logical address LBA(3) recorded in the physical-to-logical table P2L_A is invalid. Next, the processor 211 records the mark value corresponding to the first target logical address LBA(3) (which is also mapped to the first physical address PBA(A_3)) in the valid data mark table VD_A as "0". It should be noted that, the processor 211 does not add the first target logical address LBA(3) to the valid logical addresses table VLBA_A, i.e., the valid logical addresses table VLBA_A does not record the invalid target logical address.

Afterwards, the overall process returns to step S2151. By analogy, the processor 211 records the mark value corresponding to the target logical address LBA(4) (or corresponding to the target physical address PBA(A_4)) in the valid data mark table as "1", and adds the target logical address LBA(4) to the valid logical addresses table VLBA_A. It should be noted that, the value "004" of the target logical address LBA(4) is arranged subsequent to the value "002" of the target logical address LBA(2). In addition, the value "003" of the invalid target logical address LBA(3) does not exist between the value "004" of the target logical address LBA(4) and the value "002" of the target logical address LBA(2).

Afterwards, the overall process returns to step S2151. Here, because the processor 211 determines that all of the target logical addresses are selected (the target logical addresses do not have the one or more unselected target logical addresses), step S2157 is then executed, in which the processor 211 deletes the target physical-to-logical table P2L_A from the dynamic random access memory 215. Finally, the entire process of step S215 is over.

Referring back to FIG. 2, after the step of creating the valid data mark table and the valid logical addresses table corresponding to the target physical unit is over, in step SS23, the processor 211 identifies one or more valid data stored in the target physical unit according to the logical-to-physical table, the valid data mark table and the valid logical addresses table corresponding to the target physical unit. Specifically, in many memory management operations performed by the processor 211 (e.g., the garbage collection operation, an wear leveling operation or the data merging operation), since the processor 211 needs to identify the valid data stored in the target physical unit, the process of step S23 will be described in detail below with reference to FIG. 5.

Figure 5:
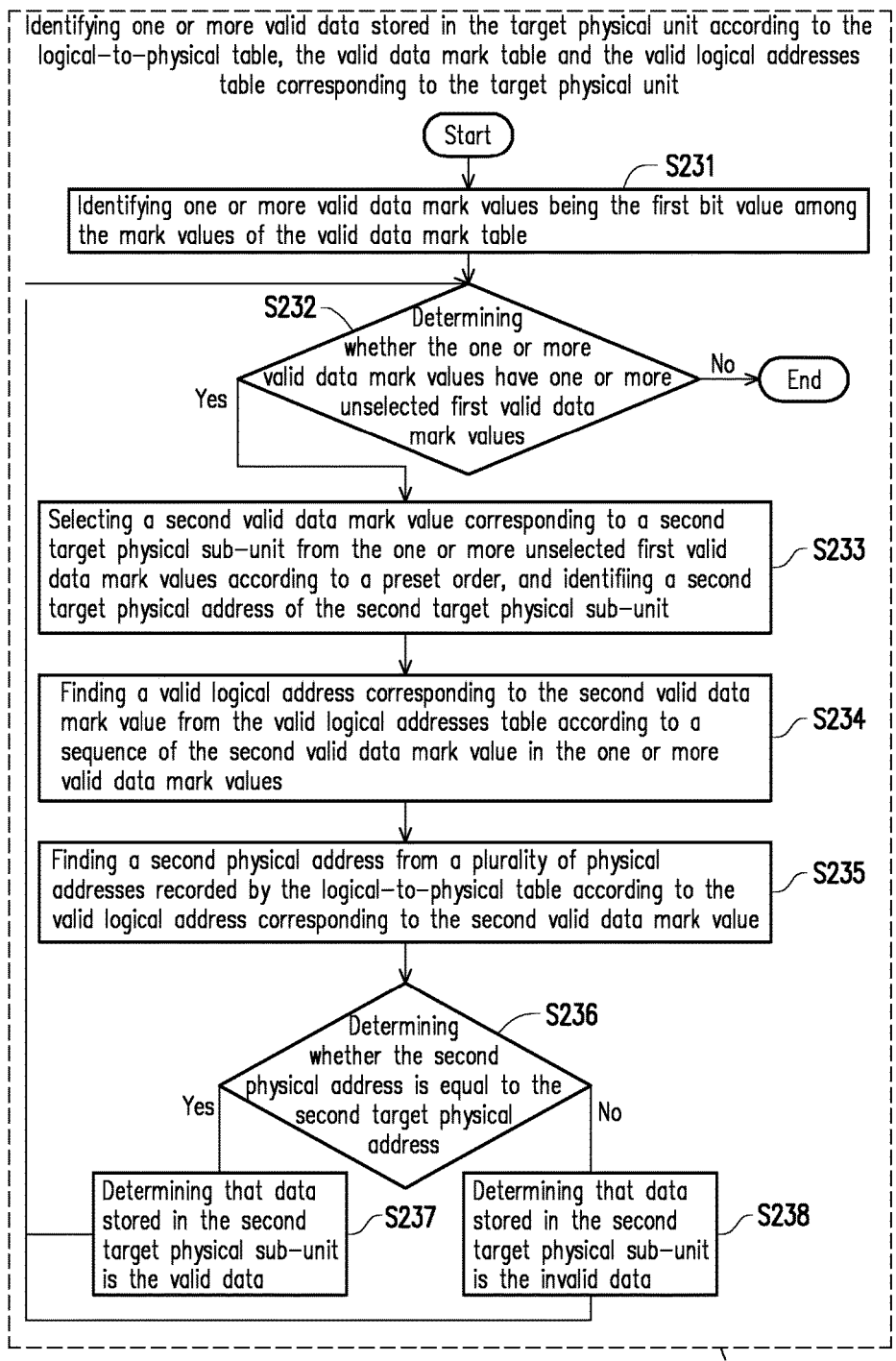
FIG. 5 is a flowchart illustrating step S23 (identifying one ore more valid data stored in the target physical unit according to the logical-to-physical table, the valid data mark table and the valid logical addresses table corresponding to the target physical unit) in FIG. 2 according to an embodiment of the invention.

FIG. 5 is a flowchart illustrating step S23 in FIG. 2 according to an embodiment of the invention. With reference to FIG. 5, in step S231, the processor 211 identifies one or more valid data mark values being the first bit value among the mark values of the valid data mark table. For instance, according to the example above, it is assumed that the processor 211 attempts to identify the valid data stored in the target physical unit A. The processor 211 first finds out all of the mark values of the valid data mark table VD_A corresponding to the target physical unit A maintained in the static random-access memory 214, so as to identify one or more mark values (also referred to as the valid data mark values) being the first bit value (i.e., "1") among the mark values. It should be noted that, when the valid data count of the target physical unit A is reduced to 0, that is, when all of the mark values in the valid data mark table VD_A are not the first bit value (i.e., all of the mark values in the valid data mark table VD_A are the second value), the processor determines that the target physical unit does not store any valid data, and thus the processor 211 does not create the valid data mark table and the valid logical addresses table for the physical units with the valid data count being 0.

If at least one valid data mark table being the first bit value is found by the processor 211 (i.e., it is determined that the mark values of the valid data mark table include the one or more valid data mark values being the first bit value), in step S232, the processor 211 only determines whether the one or more valid data mark values have one or more unselected first valid data mark values.

Specifically, the processor 211 only selects one of the unselected valid data mark values from the determined one or more valid data mark values for the subsequent operation of determining the valid data corresponding to the selected valid data mark value. In other words, at that time, the processor 211 will no longer access the mark values being the second bit value.

For instance, according to the example above, the valid data mark table VD_A has three valid data mark values respectively corresponding to the target logical addresses LBA(1), LBA(2) and LBA(4). At the beginning, none of the three valid data mark values corresponding to the target logical addresses LBA(1), LBA(2) and LBA(4) is selected (i.e., the processor 211 determines that the one or more valid data mark values have the one or more unselected first valid data mark values). Accordingly, the processor 211 continues to execute step S233. Otherwise, if it is determined that the one or more valid data mark values do not have the one or more unselected first valid data mark values (all of the first valid data mark values are being selected), the processor 211 ends the entire process of step S23.

In step S233, the processor 211 selects a second valid data mark value corresponding to a second target physical sub-unit from the one or more unselected first valid data mark values according to a preset order, and identifies a second target physical address of the second target physical sub-unit. In the present embodiment, the preset order means that the processor 211 starts to select from the first one of the unselected valid data mark values (i.e., the valid data mark value corresponding to the target logical address LBA(1)) according to the arrangement order corresponding to the target logical addresses LBA(1), LBA(2) and LBA(4). The valid data mark value (also referred to as the second valid data mark value) corresponding to the target logical address LBA(1) corresponds to the second target physical sub-unit (i.e., the target physical sub-unit having the physical address being "A_1") so the processor 211 can identify the physical address corresponding to the second target physical sub-unit as the target physical address (also referred to as the second target physical address) PBA(A_1), which has the value "A_1".

Next, in step S234, the processor 211 finds a valid logical address corresponding to the second valid data mark value from the valid logical addresses table according to an order of the second valid data mark value in the one or more valid data mark values. Specifically, after selecting the valid data mark value from the valid data mark table, the processor 211 finds the valid logical address corresponding to the selected valid data mark value from the corresponding valid logical addresses table. With the method of creating the valid logical addresses table described above, it can be known that, the arrangement order of the valid logical addresses in the valid logical addresses table matches an arrangement order of the valid data mark values (e.g., the first bit values) in the valid data mark table.

For instance, because the selected valid data mark value "001" of the valid data mark table VD_A is arranged as the first one among all of the valid data mark values, the valid logical address corresponding to the valid data mark value "001" in the valid logical addresses table is arranged as the first one (i.e., the valid logical address LBA(1), "001") among all of the valid logical addresses.

After finding the valid logical address corresponding to the second valid data mark value, in step S235, the processor 211 finds a second physical address from a plurality of physical addresses recorded by the logical-to-physical table according to the valid logical address corresponding to the second valid data mark value. For instance, the processor 211 finds out that the corresponding physical address (also referred to as the second physical address) is "A_1" from the physical addresses recorded by the logical-to-physical table L2P_0 according to the valid logical address LBA(1), "001".

Next, in step S236, the processor 211 determines whether the second physical address is equal to the second target physical address. If the second physical address is equal to the second target physical address, in step S237, the processor 211 determines that data stored in the second target physical sub-unit is the valid data. If the second physical address is not equal to the second target physical address, the processor 211 determines that data stored in the second target physical sub-unit is the invalid data.

For instance, according to the example above, the processor 211 will determine that the found second physical address is equal to the second physical address (i.e., "A_1"="A_1"). Next, the processor 211 determines that the data stored in the second target physical sub-unit is the valid data. By analogy, the processor 211 can identify all of the valid data possibly stored in the target physical unit A according to all of the valid data mark values. Further, the processor 211 can identify that the physical addresses of all of the valid data stored in the target physical unit A are the physical addresses PBA(A_1), PBA(A_2) and PBA(A_4) according to the logical-to-physical table L2P_0, the valid data mark table VD_A and the valid logical addresses table corresponding to the target physical unit A.

Other than identifying all of the valid data stored in the target physical unit by using the valid data mark table and valid logical addresses table, the valid data mark table and the valid logical addresses table may also be used to recover the logical-to-physical table.

In the present embodiment, the logical-to-physical table, one or more physical-to-logical tables and one or more valid logical addresses tables maintained in the dynamic random access memory 215 may be stored (backed up) into the rewritable non-volatile memory module 220 under specific conditions. In addition, the valid data mark table maintained in the static random access memory 214 may also be stored (backed up) into the rewritable non-volatile memory module 220 under specific conditions. When the tables are being backed up, the processor 211 also records the time for backing back each of the tables as the timestamp corresponding to the respective backed up table, and adds the timestamp corresponding to the table to the respective table. Accordingly, the processor 211 can identify versions (a backup temporal sequence) among the tables according to the timestamp included by each of the tables in the rewritable non-volatile memory module 220. In addition, information of each physical unit also includes the timestamps corresponding to each of the physical units so the processor 211 can identify temporal sequence relations among the physical units and the tables.

Under certain special conditions, such as after sudden power-off occurs, the system data stored in the static random access memory 214 or the dynamic random access memory 215 may be lost. To recover these system data (such as the logical-to-physical table), the processor 211 can execute a recovery operation after the storage device is turned on, so as to recover the logical-to-physical table, wherein steps of the recovery operation include the following steps (1) to (8).

Step (1): reading a valid first valid logical-to-physical table from the rewritable non-volatile memory module 220, and storing the first valid logical-to-physical table into the dynamic random access memory. The first valid logical-to-physical table is the latest one (the latest in time/the greatest timestamp) of the multiple logical-to-physical tables stored in the rewritable non-volatile memory module 220. Specifically, the processor 211 reads the latest first logical-to-physical table from the rewritable non-volatile memory module 220, and stores the latest first logical-to-physical table into the dynamic random access memory 215 for the subsequent recovery operation/management operation.

Step (2): identifying a first physical unit newer than the first logical-to-physical table. Next, the processor 211 identifies one or more physical units having the timestamp greater than the timestamp of the first logical-to-physical table (i.e., the physical unit newer than the first logical-to-physical table) from the physical units of the rewritable non-volatile memory module 220, and selects one of those newer physical units as the first physical unit so the subsequent recovery operation may be started.

Step (3): reading a first valid data mark table corresponding to the first physical unit from the valid data mark tables of the rewritable non-volatile memory module, and storing the first valid data mark table into a static random-access memory by the processor. Specifically, after identifying the first physical unit newer than the first logical-to-physical table, the processor 211 reads the valid data mark table corresponding to the first physical unit from the rewritable non-volatile memory module 220, and stores the valid data mark table into the static random-access memory 214.

Step (4): reading a first valid logical addresses table corresponding to the first physical unit from a plurality of valid logical addresses tables stored in the rewritable non-volatile memory module 220, and storing the first valid logical addresses table into the dynamic random access memory by the processor. Specifically, after identifying the first physical unit newer than the first logical-to-physical table, the processor 211 reads the valid logical addresses table (also referred to as the first valid logical addresses table) corresponding to first physical unit from the rewritable non-volatile memory module 220, and store the first valid logical addresses table into the dynamic random access memory 215.

Step (5): identifying one or more first mark values being the first bit value from the first valid data mark table, and identifying one or more first physical sub-units corresponding to the one or more first mark values and one or more first physical addresses corresponding thereto from the first physical unit. Specifically, the processor 211 identifies the corresponding one or more first physical addresses only according to one or more mark values being the first bit value (the valid data mark values) in the first valid data mark table.

Step (6): identifying one or more valid logical addresses corresponding to the one or more first mark values from the first valid logical addresses table according to the one or more first mark values. Specifically, as described above, the processor 211 can identify the corresponding one or more valid logical addresses according to the arrangement order of the one or more first mark values. The one or more valid logical addresses correspond to the one or more first physical addresses, respectively.

Step (7): finding one or more second physical addresses respectively corresponding to the one or more valid logical addresses recorded by the first logical-to-physical table according to the one or more valid logical addresses. Specifically, after obtaining the one or more valid logical addresses, the processors 211 can find corresponding entries (entries configured to store information of the physical addresses) in the logical-to-physical table according to the one or more valid logical addresses, and use the information recorded by the entries as one or more second physical addresses corresponding to the one or more valid logical addresses.

Step (8): replacing the one or more first physical addresses by the one or more second physical addresses in the first logical-to-physical table, respectively. Specifically, the processor 211 replaces values of the first physical addresses by values of the found second physical addresses to be stored in one or more entries corresponding to the one or more valid logical addresses in the logical-to-physical table. At this point, the recovery operation for recovering the logical-to-physical table according to the first valid data mark table and the first valid logical addresses table corresponding to the first physical unit is completed by the processor 211.

After step (8) is completed, the processor 211 can execute step (2) again to identify one or more physical units having the timestamp greater than the timestamp of the first logical-to-physical table (i.e., the physical unit newer than the first logical-to-physical table) from the physical units of the rewritable non-volatile memory module 220, and select one of the physical units having the timestamp greater than the timestamp of the first physical unit as the new first physical unit, so as to start the subsequent recovery operation (steps (3) to (8) are executed according to the new first physical unit). By analogy, according to the one or more physical units having the timestamp greater than the timestamp of the first logical-to-physical table, the processor 211 can perform the recovery operation by using the one or more physical units one by one to recover the logical-to-physical table. After all the one or more physical units (and the corresponding valid data mark table and the corresponding valid logical addresses table) are selected and used for performing the recovery operation, the recovery operation is completed for the logical-to-physical table. It should be noted that, if one of the one or more physical units having the timestamp greater than the timestamp of the first logical-to-physical table does not include the valid data mark table and valid logical addresses table backed up in the rewritable non-volatile memory module 220, and yet the said one of the physical units has the physical-to-logical table backed up in the rewritable non-volatile memory module 220, the processor 211 can recover the logical-to-physical table according to the physical-to-logical table corresponding to said one of the physical units.

In another embodiment, it is also possible that the processor 211 does not need to identify the one or more physical units having the timestamp greater than the timestamp of the first logical-to-physical table, but performs the recovery operation by directly identifying the valid data mark table and valid logical addresses table having the timestamps greater than the first logical-to-physical table as stored in the rewritable non-volatile memory module 220.

Advantages of the invention compared to the conventional art are described as follows.

With reference to FIG. 6, for instance, it is assumed that the processor 211 attempts to perform the garbage collection operation on the target physical unit A. First of all, the processor 211 needs to identify the valid data stored in the target physical unit A so as to move the identified valid data to a new physical unit before erasing the target physical unit A.

Traditionally, the processor 211 first reads the four logical addresses LBA(1) to LBA(4) recorded in the physical-to-logical table P2L_A corresponding to the target physical unit A. In order to record values of the 128 logical addresses, the processor 211 requires a size of one byte (8 bits) for recording the values of the logical addresses. In other words, to read the four logical addresses LBA(1) to LBA(4) recorded by the physical-to-logical table P2L_A, a data amount (also referred to as a first read data amount) with a size of 4*8 bits (i.e., 32 bits) is read by the processor 211.

Next, the processor 211 finds four physical addresses corresponding to the four logical addresses LBA(1) to LBA(4) from the logical-to-physical table L2P_0, and compares the found four physical addresses with four physical addresses (the four physical addresses PBA(A_1) to PBA(A_4)) corresponding to the four logical addresses LBA(1) to LBA(4) of the physical-to-logical table P2L_A so as to identify whether data stored at the four physical addresses PBA(A_1) to PBA(A_4) are the valid data.

Nonetheless, with reference to FIG. 7, according to the valid data management method provided by the invention, in order to identify the valid data stored in the target physical unit A, the processor 211 first reads all of the mark values of the valid data mark table VD_A corresponding to the target physical unit A so as to find the one or more valid data (i.e., "1"). In the example of FIG. 7, a total of the mark values is four, and a total of valid data mark values is three. Because a size of each mark value is 1 bit, to find the valid data mark value, a data amount read by the processor 211 is 4*1 bit (i.e., 4 bits).

Next, after finding the three valid data mark values, the processor 211 finds three valid logical addresses respectively corresponding to the three valid data mark values from the valid logical addresses table only for the valid data mark values. In order to find the valid data mark values, a data amount read from the valid logical addresses by the processor 211 is 3*8 (i.e., 24 bits) (a data amount read at each logical address is 8 bits). In other words, with combination of the reading operation for the valid data mark table and the reading operation for the valid logical addresses table, a total amount of the data read by the processor 211 is 28 (4+24=28) bits (also referred to as the first read data amount).

Next, the processor 211 then finds three physical addresses respectively corresponding to the three logical addresses LBA(1), LBA(2) and LBA(4) from the logical-to-physical table L2P_0, and compares the found three physical addresses with three physical addresses (three physical addresses PBA(A_1), PBA(A_2) and PBA(A_4) of the target physical unit A) corresponding to the three valid data mark tables of the valid data mark table VD_A, so as to identify whether data stored at the three physical addresses PBA(A_1), PBA(A_2) and PBA(A_4) are the valid data.

In view of the example above, it can be known that, in order to obtain the logical addresses for finding the logical-to-physical table L2P_0, the first read data amount required by the valid data management method provided by the invention is smaller than the first read data amount in the conventional art (a difference between the first read data amounts is 4 bits, which is equal to 12.5% of the originally required first read data amount, that is, 12.5% of the originally required first read data amount is saved). As the number of the physical sub-units included by each physical unit is greater and the number of the data recorded in the valid data mark table being marked as invalid is greater (the number of data marked as valid is less), such difference will be even greater.

For example, it is assumed that the target physical unit A currently used for identifying the valid data is only stored with one valid data (one physical sub-unit is stored with the valid data). Accordingly, the valid data mark table corresponding to the target physical unit A is recorded with one valid data mark value. Based on the above example, traditionally, the first read data amount required by the processor

211 is 4*8 bits (i.e., 32 bits). However, with the valid data management method provided by the invention, the first read data amount required by the processor 211 is only (4*1+1*8) bits (i.e., 12 bits). A portion of the read data amount being saved is as high as 62.5% (i.e., (32−12)/32*100%). Obviously, in the case where the valid data of each physical unit is fewer (e.g., the valid data count is less), with the valid data management method provided by the invention, the processor 211 can save even more resources for reading.

As another example, in another embodiment, it is assumed that the rewritable non-volatile memory module 220 has 32 physical units, wherein each physical unit includes 8 physical sub-units (i.e., there are 256 physical sub-units in total in the rewritable non-volatile memory module 220). In order to record the physical addresses of 256 physical sub-units and the corresponding logical addresses, the processor 211 uses a size of 9 bits for storing the values for each of the physical addresses/logical addresses. Moreover, it is further assumed that the target physical unit currently used for identifying the valid data is stored with three valid data (three physical sub-units are stored with the valid data). Accordingly, the valid data mark table corresponding to the target physical unit is recorded with three valid data mark values. Based on the above example, traditionally, the first read data amount required by the processor 211 is 8*9 bits (i.e., 72 bits). However, with the valid data management method provided by the invention, the first read data amount required by the processor 211 is only (8*1+3*9) bits (i.e., 35 bits). A portion of the read data amount being saved is as high as 51.3% (i.e., (72−35)/72*100%).

Other than saving the read data amount, since the valid data mark table is maintained in the static random access memory 214, in the case where the static random access memory 214 has a far higher speed than the dynamic random access memory 215, the consumed resources (e.g., a reading time) for reading the valid data mark table can be negligibly small to be ignored. In other words, because a size of the valid data mark table provided by the valid data management method of the invention is far smaller as compared to the physical-to-logical table, the valid data mark table may be maintained in the static random-access memory 214 so as to save the time for reading the valid data mark table.

In summary, the valid data management method and the storage controller provided by the invention are capable of creating the valid data mark table and the valid logical addresses table smaller than the physical-to-logical table according to the logical-to-physical table and the physical-to-logical table corresponding to the target physical unit, and maintaining the valid data mark table and the valid logical addresses table in the static random access memory with higher speed and smaller capacity and the dynamic random access memory with lower speed and larger capacity, respectively. In this way, the valid data mark table corresponding to the target physical unit may be quickly found, and the one or more valid data stored in the target physical unit may be identified according to the valid logical addresses table and the logical-to-physical table. As a result, identification efficiency for valid data may be improved to further improve overall working efficiency of the storage device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A valid data management method, adapted to a storage device having a rewritable non-volatile memory module, wherein the rewritable non-volatile memory module has a plurality of physical units, each physical unit among the physical units comprises a plurality of physical sub-units, and the method comprises:

creating a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit, wherein the target physical-to-logical table records target logical addresses of a plurality of target logical sub-units mapped to a plurality of target physical sub-units according to an arrangement order of the target physical sub-units of the target physical unit, and the target logical addresses respectively correspond to a plurality of target physical addresses of the target physical sub-units, wherein the created valid data mark table records a plurality of mark values respectively corresponding to the target logical addresses, wherein each mark value among the mark values is a first bit value or a second bit value, wherein the first bit value is configured to indicate that the corresponding target logical address is valid, and the second bit value is configured to indicate that the corresponding target logical address is invalid, wherein the created valid logical addresses table only records one or more valid target logical addresses respectively corresponding to one or more said first bit values according to an order of the one or more said first bit values in the valid data mark table, wherein the one or more valid target logical addresses are the target logical addresses determined as valid among the target logical addresses, wherein the valid data mark table is smaller than the valid logical addresses table, and the valid logical addresses table is smaller than the target physical-to-logical table; and identifying one or more valid data stored in the target physical unit according to the logical-to-physical table, the valid data mark table and the valid logical addresses table corresponding to the target physical unit.

2. The valid data management method according to claim 1, further comprising:

recording a number of one or more valid physical sub-units configured to store the valid data in each physical unit among the physical units as a valid data count corresponding to said each physical unit in a static random access memory or a dynamic random access memory in real time, wherein the logical-to-physical table corresponding to the rewritable non-volatile memory module is maintained in the dynamic random access memory, and the valid data mark table is maintained in the static random access memory, wherein the step of creating the valid data mark table and the valid logical addresses table corresponding to the target physical unit according to the target physical unit among the physical units, the logical-to-physical table corresponding to the rewritable non-volatile memory module and the target physical-to-logical table corresponding to the target physical unit comprises:

when the valid data mark table and the valid logical addresses table corresponding to the target physical unit do not exist and the valid data count of the target physical unit is less than a first threshold, creating the valid data mark table and the valid logical addresses table according to the logical-to-physical table and the target physical-to-logical table corresponding to the target physical unit, and when the valid data mark table and the valid logical addresses table corresponding to the target physical unit exist and the valid data count of the target physical unit is less than a second threshold, creating the valid data mark table and the valid logical addresses table according to the logical-to-physical table and the target physical-to-logical table corresponding to the target physical unit, wherein the second threshold is less than the first threshold.

3. The valid data management method according to claim 2, wherein the step of creating the valid data mark table and the valid logical addresses table according to the logical-to-physical table and the target physical-to-logical table corresponding to the target physical unit comprises steps of:

(1) if the target logical addresses have one or more unselected target logical addresses, selecting a first target logical address corresponding to a first target physical sub-unit from the one or more unselected target logical addresses according to a preset order, and identifying a first target physical address of the first target physical sub-unit, wherein if the target logical addresses do not have the one or more unselected target logical addresses, deleting the target physical-to-logical table from the dynamic random access memory, and completing the step of creating the valid data mark table and the valid logical addresses table;

(2) finding a first physical address from a plurality of physical addresses recorded by the logical-to-physical table according to the first target logical address;

(3) determining whether the first physical address is equal to the first target physical address, wherein the step (4) is executed when determining that the first physical address is equal to the first target physical address, wherein the step (5) is executed when determining that the first physical address is not equal to the first target physical address;

(4) determining that the first target logical address is valid, recording a first mark value corresponding to the first target logical address in the valid data mark table as the first bit value, adding the first target logical address to the valid logical addresses table, and re-executing the step (1); and (5) determining that the first target logical address is invalid, recording the first mark value corresponding to the first target logical address in the valid data mark table as the second bit value, not adding the first target logical address to the valid logical addresses table, and re-executing the step (1).

4. The valid data management method according to claim 1, wherein the mark values of the valid data mark table respectively correspond to the target physical sub-units, wherein the step of identifying the one or more valid data stored in the target physical unit according to the logical-to-physical table corresponding to the rewritable non-volatile memory module, the valid data mark table and the valid logical addresses table corresponding to the target physical unit comprises steps of:

(1) identifying one or more valid data mark values being the first bit value among the mark values of the valid data mark table, wherein if all of the mark values of the valid data mark table are the second bit value, determining that the target physical unit is not stored with any valid data;

(2) only identifying one or more unselected first valid data mark values among the one or more valid data mark values, selecting a second valid data mark value corresponding to a second target physical sub-unit from the one or more unselected valid data mark values according to a preset order, and identifying a second target physical address of the second target physical sub-unit, wherein if the one or more valid data mark values do not have the one or more unselected first valid data mark values, completing the step of identifying the one or more valid data stored in the target physical unit;

(3) finding a valid logical address corresponding to the second valid data mark value from the valid logical addresses table according to an order of the second valid data mark value in the one or more valid data mark values;

(4) finding a second physical address from a plurality of physical addresses recorded by the logical-to-physical table according to the valid logical address corresponding to the second valid data mark value;

(5) determining whether the second physical address is equal to the second target physical address, wherein the step (6) is executed when determining that the second physical address is equal to the second target physical address, wherein the step (7) is executed when determining that the second physical address is not equal to the second target physical address;

(6) determining that data stored in the second target physical sub-unit is the valid data, and re-executing the step (2); and (7) determining that the data stored in the second target physical sub-unit is invalid data, and re-executing the step (2).

5. The valid data management method according to claim 1, further comprising:

executing a recovery operation to recover the logical-to-physical table, wherein steps of the recovery operation comprise:

reading a valid first logical-to-physical table from the rewritable non-volatile memory module, and storing the first logical-to-physical table into a dynamic random access memory;

identifying a first physical unit newer than the first logical-to-physical table;

reading a first valid data mark table corresponding to the first physical unit from the valid data mark tables of the rewritable non-volatile memory module, and storing the first valid data mark table into a static random-access memory;

reading a first valid logical addresses table corresponding to the first physical unit from a plurality of valid logical addresses tables stored in the rewritable non-volatile memory module, and storing the first valid logical addresses table into the dynamic random access memory;

identifying one or more first mark values being the first bit value from the first valid data mark table, and identifying one or more first physical sub-units corresponding to the one or more first mark values and one or more first physical addresses corresponding thereto from the first physical unit;

identifying one or more valid logical addresses corresponding to the one or more first mark values from the first valid logical addresses table according to the one or more first mark values;

finding one or more second physical addresses respectively corresponding to the one or more valid logical addresses recorded by the first logical-to-physical table according to the one or more valid logical addresses; and replacing the one or more first physical addresses by the one or more second physical addresses in the first logical-to-physical table, respectively.

6. A storage controller, configured to control a storage device having a rewritable non-volatile memory module, wherein the rewritable non-volatile memory module comprises a plurality of physical units, wherein the rewritable non-volatile memory module has a plurality of physical units, each physical unit among the physical units comprises a plurality of physical sub-units, and the storage controller comprises:

a memory interface control circuit, configured to couple to the rewritable non-volatile memory module; and a processor, coupled to the memory interface control circuit, wherein the processor is configured to create a valid data mark table and a valid logical addresses table corresponding to a target physical unit according to the target physical unit among the physical units, a logical-to-physical table corresponding to the rewritable non-volatile memory module and a target physical-to-logical table corresponding to the target physical unit, wherein the target physical-to-logical table records target logical addresses of a plurality of target logical sub-units mapped to a plurality of target physical sub-units according to an arrangement order of the target physical sub-units of the target physical unit, and the target logical addresses respectively correspond to a plurality of target physical addresses of the target physical sub-units, wherein the created valid data mark table records a plurality of mark values respectively corresponding to the target logical addresses, wherein each mark value among the mark values is a first bit value or a second bit value, wherein the first bit value is configured to indicate that the corresponding target logical address is valid, and the second bit value is configured to indicate that the corresponding target logical address is invalid, wherein the created valid logical addresses table only records one or more valid target logical addresses respectively corresponding to one or more said first bit values according to an order of the one or more said first bit values in the valid data mark table, wherein the one or more valid target logical addresses are the target logical addresses determined as valid among the target logical addresses, wherein the valid data mark table is smaller than the valid logical addresses table, and the valid logical addresses table is smaller than the target physical-to-logical table, wherein the processor is further configured to identify one or more valid data stored in the target physical unit according to the logical-to-physical table, the valid data mark table and the valid logical addresses table corresponding to the target physical unit.

7. The storage controller according to claim 6, wherein the processor records a number of one or more valid physical sub-units configured to store the valid data in each physical unit among the physical units as a valid data count corresponding to said each physical unit in a static random access memory or a dynamic random access memory in real time, wherein the logical-to-physical table corresponding to the rewritable non-volatile memory module is maintained in the dynamic random access memory, and the valid data mark table is maintained in the static random access memory, wherein in the operation of creating the valid data mark table and the valid logical addresses table corresponding to the target physical unit according to the target physical unit among the physical units, the logical-to-physical table corresponding to the rewritable non-volatile memory module and the target physical-to-logical table corresponding to the target physical unit by the processor, when the valid data mark table and the valid logical addresses table corresponding to the target physical unit do not exist and the valid data count of the target physical unit is less than a first threshold, the processor creates the valid data mark table and the valid logical addresses table according to the logical-to-physical table and the target physical-to-logical table corresponding to the target physical unit;

when the valid data mark table and the valid logical addresses table corresponding to the target physical unit exist and the valid data count of the target physical unit is less than a second threshold, the processor creates the valid data mark table and the valid logical addresses table according to the logical-to-physical table and the target physical-to-logical table corresponding to the target physical unit, wherein the second threshold is less than the first threshold.

8. The storage controller according to claim 7, wherein in the operation of creating the valid data mark table and the valid logical addresses table according to the logical-to-physical table and the target physical-to-logical table corresponding to the target physical unit by the processor, the processor executes steps of:

(1) if the target logical addresses have one or more unselected target logical addresses, selecting a first target logical address corresponding to a first target physical sub-unit from the one or more unselected target logical addresses according to a preset order, and identifying a first target physical address of the first target physical sub-unit, wherein if the target logical addresses do not have the one or more unselected target logical addresses, deleting the target physical-to-logical table from the dynamic random access memory, and completing the step of creating the valid data mark table and the valid logical addresses table;

(2) finding a first physical address from a plurality of physical addresses recorded by the logical-to-physical table according to the first target logical address;

(3) determining whether the first physical address is equal to the first target physical address, wherein the step (4) is executed when determining that the first physical address is equal to the first target physical address, wherein the step (5) is executed when determining that the first physical address is not equal to the first target physical address;

(4) determining that the first target logical address is valid, recording a first mark value corresponding to the first target logical address in the valid data mark table as the first bit value, adding the first target logical address to the valid logical addresses table, and re-executing the step (1); and (5) determining that the first target logical address is invalid, recording the first mark value corresponding to the first target logical address in the valid data mark table as the second bit value, not adding the first target logical address to the valid logical addresses table, and re-executing the step (1).

9. The storage controller according to claim 6, wherein the mark values of the valid data mark table respectively correspond to the target physical sub-units, wherein in the operation of identifying the one or more valid data stored in the target physical unit according to the logical-to-physical table corresponding to the rewritable non-volatile memory module, the valid data mark table and the valid logical addresses table corresponding to the target physical unit, the processor executes steps of:

(1) identifying one or more valid data mark values being the first bit value among the mark values of the valid data mark table, wherein if all of the mark values of the valid data mark table are the second bit value, determining that the target physical unit is not stored with any valid data;

(2) only identifying one or more unselected first valid data mark values among the one or more valid data mark values, selecting a second valid data mark value corresponding to a second target physical sub-unit from the one or more unselected valid data mark values according to a preset order, and identifying a second target physical address of the second target physical sub-unit, wherein if the one or more valid data mark values do not have the one or more unselected first valid data mark values, completing the step of identifying the one or more valid data stored in the target physical unit;

(3) finding a valid logical address corresponding to the second valid data mark value from the valid logical addresses table according to an order of the second valid data mark value in the one or more valid data mark values;

(4) finding a second physical address from a plurality of physical addresses recorded by the logical-to-physical table according to the valid logical address corresponding to the second valid data mark value;

(5) determining whether the second physical address is equal to the second target physical address, wherein the step (6) is executed when determining that the second physical address is equal to the second target physical address, wherein the step (7) is executed when determining that the second physical address is not equal to the second target physical address;

(6) determining that data stored in the second target physical sub-unit is the valid data, and re-executing the step (2); and (7) determining that the data stored in the second target physical sub-unit is invalid data, and re-executing the step (2).

10. The storage controller according to claim 6, wherein the processor is further configured to execute a recovery operation to recover the logical-to-physical table, wherein steps of the recovery operation comprise:

reading a valid first logical-to-physical table from the rewritable non-volatile memory module, and storing the first logical-to-physical table into a dynamic random access memory;

identifying a first physical unit newer than the first logical-to-physical table by the processor;

reading a first valid data mark table corresponding to the first physical unit from the valid data mark tables of the rewritable non-volatile memory module and storing the first valid data mark table into a static random-access memory by the processor;

reading a first valid logical addresses table corresponding to the first physical unit from a plurality of valid logical addresses tables stored in the rewritable non-volatile memory module and storing the first valid logical addresses table into the dynamic random access memory by the processor;

identifying one or more first mark values being the first bit value from the first valid data mark table and identifying one or more first physical sub-units corresponding to the one or more first mark values and one or more first physical addresses corresponding thereto from the first physical unit by the processor;

identifying one or more valid logical addresses corresponding to the one or more first mark values from the first valid logical addresses table according to the one or more first mark values by the processor;

finding one or more second physical addresses respectively corresponding to the one or more valid logical addresses recorded by the first logical-to-physical table according to the one or more valid logical addresses by the processor; and replacing the one or more first physical addresses by one or more second physical addresses in the first logical-to-physical table, respectively, by the processor.

* * * * *